(12) United States Patent
    Yang

(10) Patent No.: US 10,586,170 B2
(45) Date of Patent: Mar. 10, 2020

(54) METHOD AND SYSTEM FOR BUILDING A HUMAN FALL DETECTION MODEL

(71) Applicant: SHENZHEN ZHIYING TECHNOLOGIES CO., LTD., Shenzhen (CN)

(72) Inventor: Song Yang, Guangzhou (CN)

(73) Assignee: SHENZHEN ZHIYING TECHNOLOGIES CO., LTD., Shenzhen (CN)

( * ) Notice: Subject to any disclaimer, the term of this patent is extended or adjusted under 35 U.S.C. 154(b) by 929 days.

(21) Appl. No.: 15/084,512

(22) Filed: Mar. 30, 2016

(65) Prior Publication Data
    US 2016/0210562 A1    Jul. 21, 2016

Related U.S. Application Data

(63) Continuation of application No. PCT/CN2014/087969, filed on Sep. 30, 2014.

(30) Foreign Application Priority Data

Sep. 30, 2013 (CN) .......................... 2013 1 0469706

(51) Int. Cl.
    *G06N 99/00* (2019.01)
    *G01P 15/16* (2013.01)
    *G06N 20/00* (2019.01)
    *G06N 5/04* (2006.01)
    *G08B 21/04* (2006.01)

(52) U.S. Cl.
    CPC .............. *G06N 20/00* (2019.01); *G01P 15/16* (2013.01); *G06N 5/04* (2013.01); *G08B 21/0446* (2013.01)

(58) Field of Classification Search
    None
    See application file for complete search history.

(56) References Cited

U.S. PATENT DOCUMENTS

| 8,206,325 B1 * | 6/2012 | Najafi .................. A61B 5/1116 600/595 |
| 2009/0021858 A1 * | 1/2009 | Fu ........................ G11B 5/5582 360/99.01 |
| 2012/0101411 A1 * | 4/2012 | Hausdorff ............. A61B 5/1117 600/595 |

FOREIGN PATENT DOCUMENTS

| CN | 102610056 A | 7/2012 |
| CN | 102667882 A | 9/2012 |
| CN | 103177530 A | 6/2013 |

OTHER PUBLICATIONS

International Search Report of PCT Patent Application No. PCT/CN2014/087969 dated Jan. 14, 2015.

* cited by examiner

*Primary Examiner* — Li Wu Chang

(57) ABSTRACT

The present invention discloses a method and a system for building a human fall detection model. The method can include: collecting the speed information of one and more human fall samples in the human fall process; the speed information includes resultant acceleration, speed and time; analyzing the characteristics of the speed information, calculating and extracting low acceleration threshold value $a_0$, resultant acceleration series within fixed time $I_0$, high acceleration threshold value $a1$, curve area threshold value $\Delta S$ and low acceleration time threshold value $\Delta T$, and building the fall detection mechanism. The system of the present invention fully takes into account the characteristics of human body's movement behaviors, so as to increase the detection rate and reduce the misjudgment rate.

11 Claims, 11 Drawing Sheets

METHOD AND SYSTEM FOR BUILDING A HUMAN FALL DETECTION MODEL

CROSS-REFERENCE TO RELATED APPLICATIONS

The present application is a Continuation Application of PCT application No. PCT/CN2014/087969 filed on Sep. 30, 2014, which claims the benefit of Chinese Patent Application No. 201310469706.8 filed on Sep. 30, 2013, the contents of which are hereby incorporated by reference.

FIELD OF THE INVENTION

The present invention relates to a human fall detection technique, and more particularly relates to a method and a system for building a human fall detection model.

BACKGROUND OF THE INVENTION

According to the world disease control and prevention organization statistics, among the 65-year-old and above elderly in the world, one third of them would fall every year, of which half would fall again. Nearly 10% of one-time falls could cause serious injury and disease, resulting in a huge medical burden and health damage. China's elderly population will exceed 200 million in 2014 and will reach 300 million in 2025, and the proportion of the elderly population will exceed 30% in 2042. The elderly fall has become a current major medical and social problem, and reducing the harm from elderly fall has become a new research hotspot at home and abroad for relieving the medical burden of both medical security system and the elderly's children, and is especially of important application value for the elderly whose children live away from home or who often go out for a walk.

There have been a number of fall detection devices in China, most of which are based on a special equipment and must be additionally worn, bringing extreme inconvenience to the elderly. And due to limitations of information processing methods and equipment, or failure to fully take into account the movement behavior of human body and other reasons, the related detection methods have high misjudgment rate.

SUMMARY OF THE INVENTION

The main purpose of the present invention is to provide a method for building a human fall detection model, which can improve the accuracy of judgment on fall.

The present invention provides a method for building a human fall detection model, which includes:

collecting the speed information of one and more human fall samples in the human fall process; the speed information includes resultant acceleration, speed and time;

analyzing the characteristics of the speed information, calculating and extracting low acceleration threshold value $a_0$, resultant acceleration series within fixed time $I_0$, high acceleration threshold value a1, curve area threshold value $\Delta S$ and low acceleration time threshold value $\Delta T$, and building the fall detection mechanism.

Preferably, the step of analyzing the characteristics of the speed information, calculating and extracting low acceleration threshold value $a_0$, resultant acceleration series within fixed time $I_0$, high acceleration threshold value a1, curve area threshold value $\Delta S$ and low acceleration time threshold value $\Delta T$ also includes:

associating the calculated and extracted low acceleration threshold value $a_0$, resultant acceleration series within fixed time $I_0$, high acceleration threshold value $a_1$, curve area threshold value $\Delta S$ and low acceleration time threshold value $\Delta T$ with the corresponding human body state information to the sample; the human body state information includes height, weight and/or state of movement.

Preferably, after the step of building the fall detection mechanism, the following is also included:

receiving the setup of human body state information, and adjusting $a_0$, $\Delta S$ and/or $\Delta T$ according to the human body state information;

preferably, after the method, the following is also included:

incorporating the self-detected human fall samples in the fall detection mechanism, and associating the speed information of the samples with the human body state information.

The present invention also provides a human fall detection model system, including:

a sample collection module, which is used to collect the speed information of one and more human fall samples in the human fall process; the speed information includes resultant acceleration, speed and time;

an analysis and extraction module, which is used to analyze the characteristics of the speed information, calculate and extract low acceleration threshold value $a_0$, resultant acceleration series within fixed time $I_0$, high acceleration threshold value a1, curve area threshold value $\Delta S$ and low acceleration time threshold value $\Delta T$, and build the fall detection mechanism.

Preferably, the analysis and extraction module is also used to:

associate the calculated and extracted low acceleration threshold value $a_0$, resultant acceleration series within fixed time $I_0$, high acceleration threshold value $a_1$, curve area threshold value $\Delta S$ and low acceleration time threshold value $\Delta T$ with the corresponding human body state information to the sample; the human body state information includes height, weight and/or state of movement.

Preferably, the system also includes:

a setup receiving module, which is used to receive the setup of human state information, and to adjust $a_0$, $\Delta S$ and/or $\Delta T$ according to the preset human body state information.

Preferably, the system also includes:

a self-learning module, which is used to incorporate the self-detected human fall samples into the fall detection mechanism, and associate the speed information of the sample with the human body state information.

The present invention can be based on smart phones and other devices with acceleration detection and communication functions, and is based on the kinematic and dynamic differences between the safe movement state and the fall of human body. As long as a user carries a smart phone installed with the human fall detection application with him, the application will automatically collect and analyze dynamic information of the human body, judge whether the human falls or not, and can send SMS and make a call to give alarm or notification by virtue of the communication advantage of mobile phone. Compared to other fall detection devices that require additionally purchasing and outfitting, the present invention has advantages of wide application range, low price, convenience to carry and thus relatively high practicability; the key lies in that the present invention gives full consideration to the movement behavior characteristics of human body, increases the detection rate and reduces the misjudgment rate.

Figure 1:
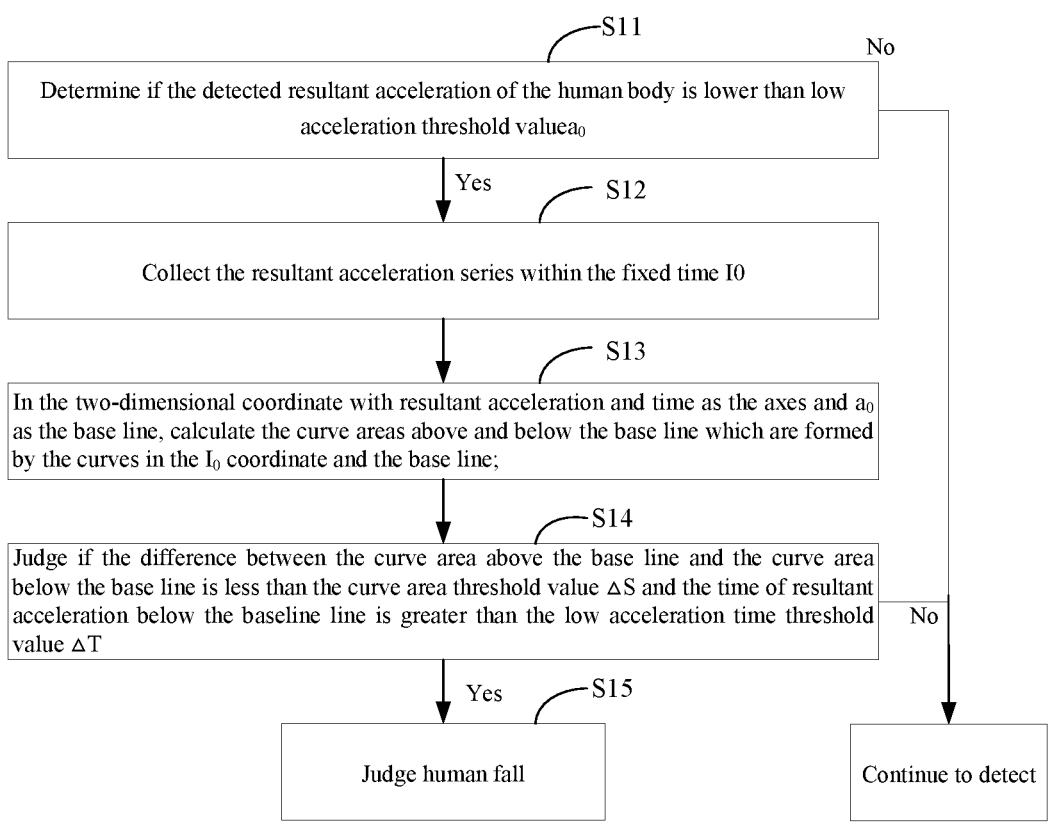
FIG. 1 is a schematic view of the step process of an embodiment of the human fall detection method under the present invention.

Objective achievement, function characteristics and advantages of the present invention will be further illustrated by referring to the drawings and combining with the embodiments.

DETAILED DESCRIPTION OF THE PREFERRED EMBODIMENT

It should be understood that the embodiment described hereby is only used to explain the present invention, rather than to limit the present invention.

Referring to FIG. 1, an embodiment of a human fall detection method under the present invention is provided. The human fall detection method can include:

Step S11, judge if the detected human resultant acceleration is less than the low acceleration threshold value $a_0$; if yes, then go to Step S12; otherwise, continue to detect;

Step S12, collect resultant acceleration series within fixed time $I_0$;

Step S13, in the two-dimensional coordinate with resultant acceleration and time as the axes and $a_0$ as the base line, calculate the curve areas above and below the base line which are surrounded by the curve sin the $I_0$ coordinate and the base line;

Step S14, judge if the difference between the curve area above the base line and the curve area below the base line is less than the curve area threshold value $\Delta S$ and the time of resultant acceleration below the baseline line is greater than the low acceleration time threshold value $\Delta T$; if yes, go to Step S15; otherwise, continue to detect.

Step S15, judge human fall.

In view of the problems existing in the existing fall detection techniques and detection devices, the present invention provides a human fall detection method, which automatically detect the human body's acceleration information and speed information through a sensor, and correctly judge whether the human body has fallen or not by comprehensively analyzing human body's acceleration, speed, movement time and movement state, and remind if it's necessary to alarm for help, and the alarm can also be confirmed and canceled.

To achieve the human fall detection method, the device must at least be equipped with an acceleration sensor (such as three-axis acceleration sensor) as well as a communication module (such as the GSM module and CDMA module among the mobile communication modules) to achieve the function of calling for help. In order to be easy to carry and convenient to use, the device can be a mobile terminal, such as smart mobile phone, tablet computer and other common mobile terminal units. Because such common mobile terminal units are usually provided with communication modules and acceleration sensors, they can be directly used without additional configuration.

Figure 2:
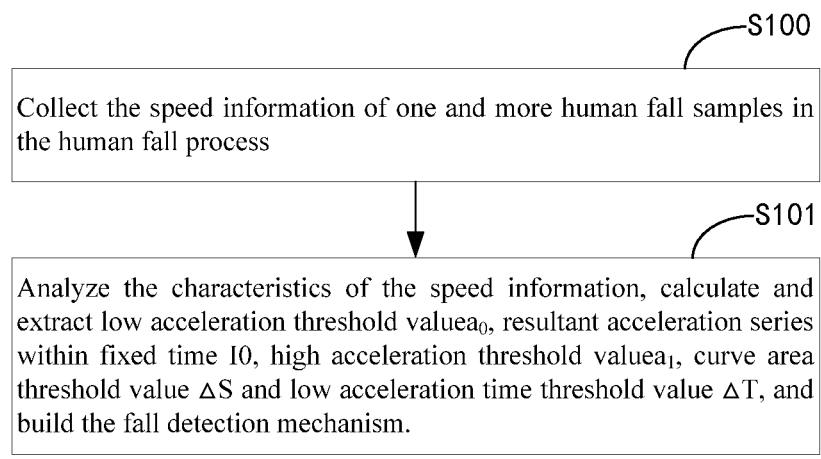
FIG. 2 is a schematic view of the step process of an embodiment of the human fall detection model building method under the present invention.

Referring to FIG. 2, an embodiment of the method for building a human fall detection model is provided. The method can be arranged before Step S11, and includes:

Step S100, collect the speed information of one and more human fall samples in the human fall process; the speed information includes resultant acceleration, speed and time;

Step S101, analyze the characteristics of the speed information, calculate and extract low acceleration threshold value $a_0$, resultant acceleration series within fixed time $I_0$, high acceleration threshold value a1, curve area threshold value $\Delta S$ and low acceleration time threshold value $\Delta T$, and build the fall detection mechanism.

Before achieving fall detection, collect the speed information in the human fall process through a plurality of fall experiments; the speed information includes resultant acceleration, speed and time; moreover, record the acceleration time series before the fall and collision, extract some acceleration characteristics, and build a fall detection model. The model can be constantly trained and optimized through the fall data.

The building of the fall detection model is a very important part to achieve accurate fall detection. First, analyze the related acceleration data acquired based on some experiments and related fall data; second, filter, fuse and extract kinematic and dynamic characteristics of human fall, such as: long-time low acceleration before fall, staggering before fall, etc., thereby establishing a fall detection model, and the model can be constantly training and self-adjusted. In the experiment, the movement state and fall of human body can be detected according to change of three-axis acceleration, wherein, the following characteristics can be extracted: low acceleration state of fall, speed, high speed state of staggering before collision, high speed state of collision and time of various state; third, build a dynamic human fall detection model according to the characteristics in order to match the three-axis acceleration value of human body movement, and judge whether human falls or not according to the output probability. Some parameters in the model can be adjusted according to height, weight and movement quantity of human body and real-time movement state of human body.

For the calculated low acceleration threshold value $a_0$, resultant acceleration series within fixed time $I_0$, high acceleration threshold value a1, curve area threshold value $\Delta S$ and low acceleration time threshold value $\Delta T$: the calculated and extracted low acceleration threshold value $a_0$, resultant acceleration series within fixed time $I_0$, high acceleration threshold value a1, curve area threshold value $\Delta S$ and low acceleration time threshold value $\Delta T$ can be associated with the corresponding human body state information to the sample; the human body state information includes height, weight and/or state of movement, etc. The height and weight can be an interval value.

Figure 3:
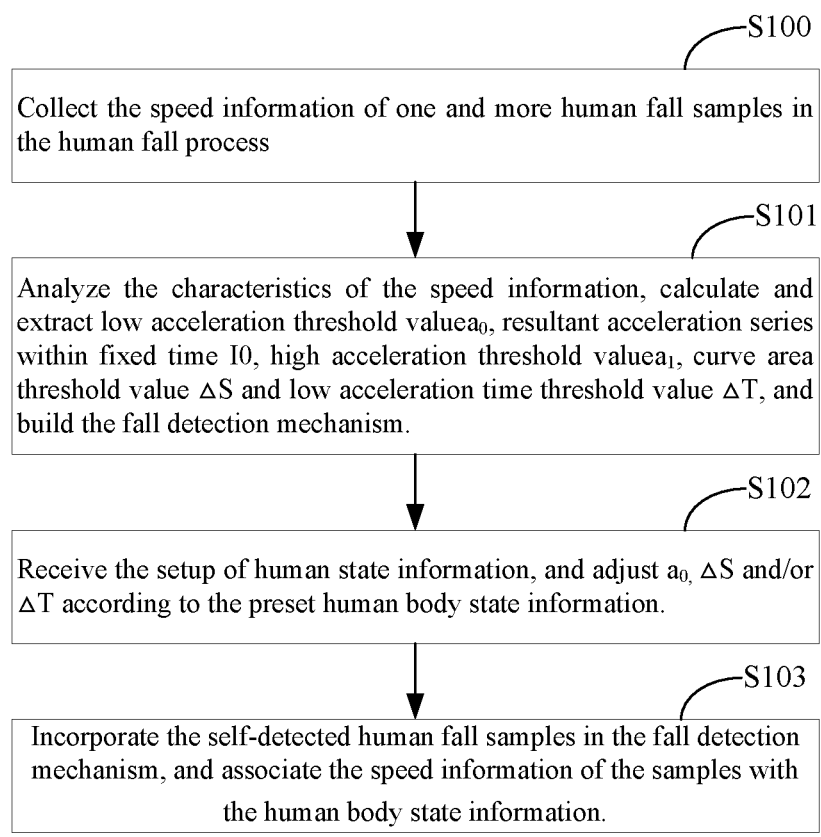
FIG. 3 is a schematic view of the step process of another embodiment of the human fall detection model building method under the present invention.

Referring to FIG. 3, another embodiment of the present invention can also include the following before Step S11 and after Step S101:

Step S102, receiving the setup of human body state information, and adjusting $a_0$, $\Delta S$ and/or $\Delta T$ according to the human body state information.

Because the model parameters can vary with human's height, weight, and real-time movement state, different users can set different parameters according to their different body state information, and the detection device will match corresponding $a_0$, $\Delta S$ and/or $\Delta T$ and other parameters according to the preset body state information.

After the Step S102, the following can also be included:

Step S103, incorporate the self-detected human fall samples in the fall detection mechanism, and associate the speed information of the samples with the human body state information.

After the human fall detection model accurately judges a human fall event, such fall event can be incorporated in the human fall detection model after confirmed by the user. For example, collect and analyze the speed information in the human fall process, from which extract low acceleration threshold value $a_0$, resultant acceleration series within fixed time $I_0$, high acceleration threshold value a1, curve area threshold value $\Delta S$ and low acceleration time threshold value $\Delta T$, and associate the speed information with the human body state information, amend the established fall detection mechanism, in order to achieve the self-learning mechanism of the human fall detection model.

Figure 4:
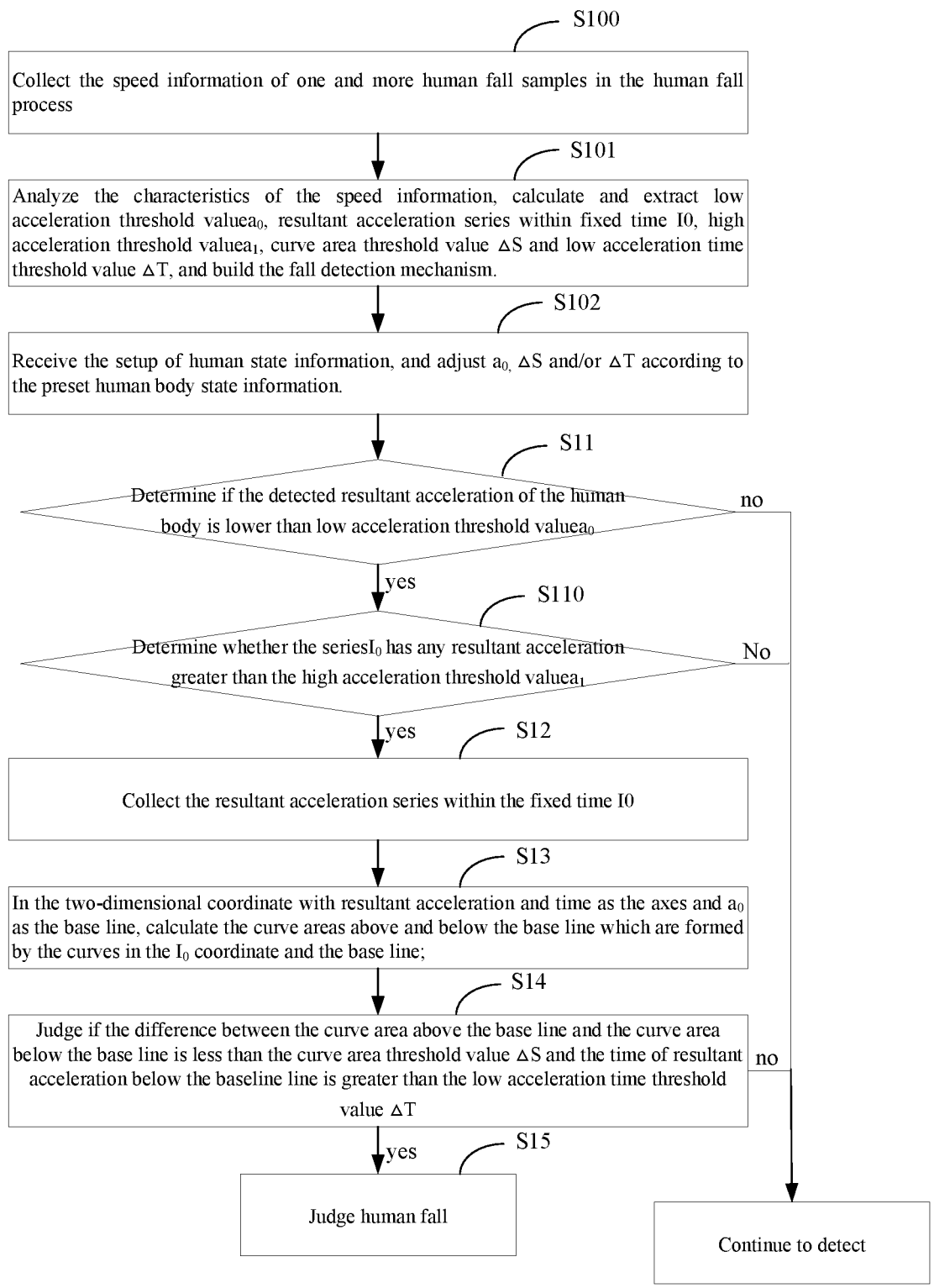
FIG. 4 is a schematic view of the step process of another embodiment of the human fall detection method under the present invention.

Referring to FIG. 4, another embodiment of the present invention can also include the following after the Step S11:

Step S110, While collecting the resultant acceleration series $I_0$, determine whether the series $I_0$ has any resultant acceleration greater than the high acceleration threshold value $a_1$; if yes, go to Step S12, otherwise, continue to detect.

There is always a process of maintaining low acceleration for a relatively long time before human fall, and higher acceleration also may occur before collision due to staggering and other external factors, therefore, detect the high acceleration again after the low acceleration process has been detected; if the high resultant acceleration is greater than the high acceleration threshold value $a_1$, go to the next step of fall judgment; otherwise, it can be judged no fall, and return to the initial resultant acceleration detection and judgment.

Figure 5:
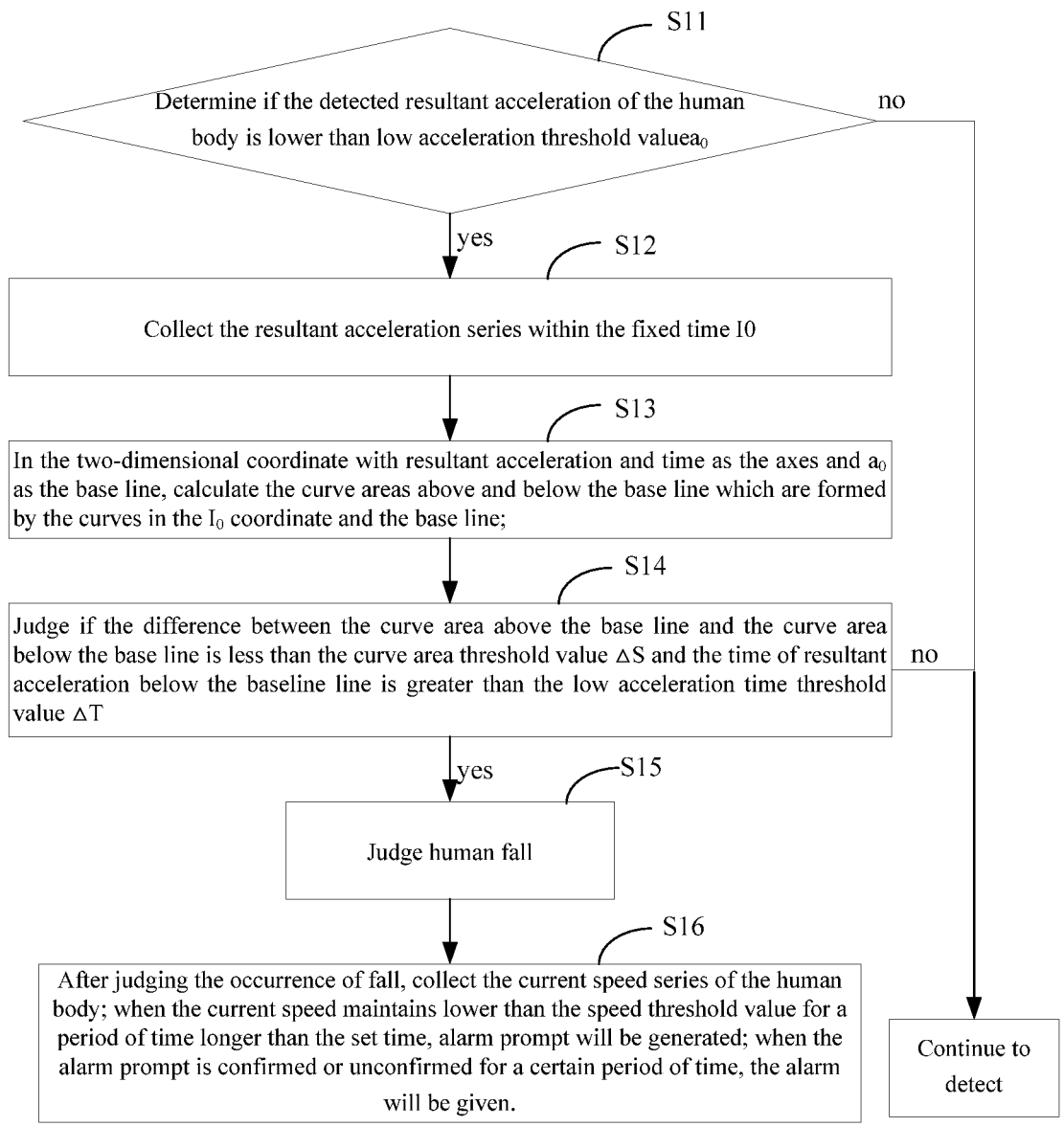
FIG. 5 is a schematic view of the step process of yet another embodiment of the human fall detection method under the present invention.

Referring to FIG. 5, yet another embodiment of the present invention can also include the following after the Steps S15:

Step S16, after judging the occurrence of fall, collect the current speed series of the human body; when the current speed maintains lower than the speed threshold value for a period of time longer than the set time, alarm prompt will be generated; when the alarm prompt is confirmed or unconfirmed for a certain period of time, the alarm will be given.

During the human fall detection in the embodiment, first of all, the initial speed of human body can be defaulted to zero, and the speed of the human body in every moment can be calculated according to the change of the three-axis acceleration (the gravitational acceleration has been taken into account). The three-axis acceleration will change along with the movement of the human body, so does the speed. According to the experimental data, an acceleration time series within a fixed length of time, and the time series can completely record the acceleration value of a fall process (including a period of time before and after the fall). Because the human body has a low acceleration state before fall, a low acceleration threshold value can also be drawn according to the experimental data. When the acceleration of the human body in the movement process is lower than the low acceleration threshold value, collecting acceleration data can begin in order to supply data for the fall detection model to detect, so as to further judge whether to collect data or empty data, and record the time (that is, go to the time series step). Because the human body may be in the high acceleration state before the collision due to staggering and other reasons, high acceleration can be further judged after judging the low acceleration; a high acceleration threshold value is drawn according to the experimental data, and when the acceleration of the human body in the movement process is higher than the high acceleration threshold value, the detection model can be used to match the collected acceleration data.

Then, calculating according to the set human body information such as height, weight and/or movement state, as well as the collected speed and acceleration information before and during the fall, and match with the model parameters; if the match is successful, occurrence of fall is indicated, and whether to give an alarm will be judged according to the speed information of the human body. If the human body maintains a sate lower than the speed threshold value for a period of time longer than the set time, alarm prompt will be generated, and the user can choose whether to alarm or not according to the actual situation. If there is not any operation for a certain period of time, the alarm will be given to the preset telephone number by means of SMS and/or phone call.

Meanwhile, a high acceleration threshold value can also be drawn according to the experimental data. When the resultant acceleration of the human body is greater than the threshold value, there is a possibility that the user comes under instantaneous intense collision, such as traffic accident. If the real-time monitored resultant acceleration is greater than the threshold value, alarm prompt will be directly generated, and the alarm will be given after confirmed by the user or timeout of the prompt.

Figure 6:
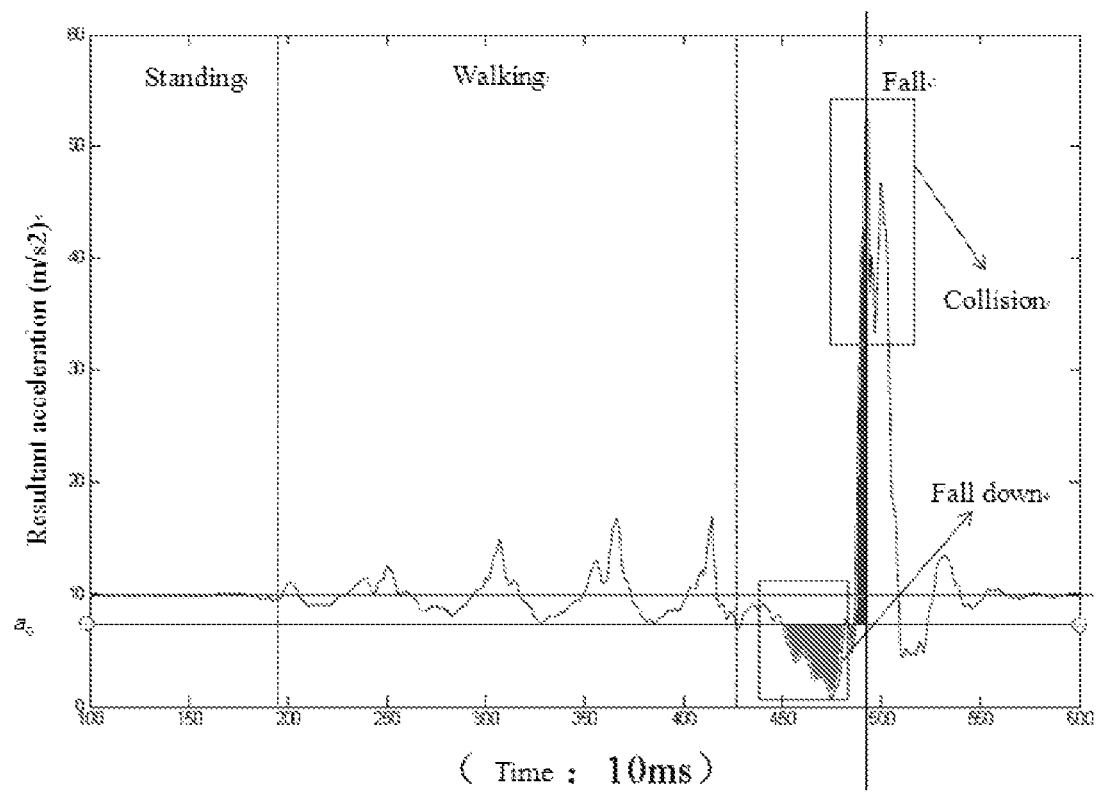
FIG. 6 is a two-dimensional coordinate schematic view with time as the horizontal coordinate and the resultant acceleration as the vertical coordinate in an embodiment of the human fall detection method under the present invention.

Referring to FIG. 6, a two-dimensional coordinate schematic view with time (10 ms) as the horizontal coordinate and the resultant (force) acceleration (m/s2) as the vertical coordinate, and the resultant acceleration $a_0$ as the base line, displays that the detected resultant accelerations vary with time in the fall process: at the time from 100 to about 190, the resultant accelerations are about 10, indicating that the user may be standing; at the time from about 190 to about 430, the resultant accelerations vary up and down 10 uniformly and regularly, all of which are above $a_0$, indicating that the user may be walking normally; at the time from about 450 to about 490, the resultant accelerations first turn out lower than $a_0$ and lasts from 450 to 480, and then transitory high accelerations times higher than the normal state (10) occur and last between 480 and 490, wherein, the low accelerations indicate that the user may be in the state before fall, and the high accelerations indicate that the user may be in the state of collision after fall; it is obviously shown that, during the fall process, the curve area (surrounded by the curves formed by the accelerations in the coordinate and the base line) below the base line are greater than the curve area above the base line.

The calculation and matching method in the fall detection model is as follows: firstly, determine the low acceleration threshold value $a_0$ based on experiment and research, and when the resultant acceleration value generated in the process of human movement is lower than $a_0$, start collecting three-axis acceleration sensor data until a fixed acceleration time series $I_0$; and at the same time calculate as follows: calculate the acceleration curve area based on the base line $a_0$ from the moment of data collection, if the area surrounded by the acceleration and the base line $a_0$ is above the base line, the area value is taken as positive, otherwise negative, and the total curve area is the curve area above the base line plus the curve area below the baseline (i.e. equivalent to the difference of the curve area above the base line and the curve area below the base line when both of them are taken as positive); as long as the curve area is less than $\Delta S$, and the sum of the time in $I_0$ when the acceleration is lower than the acceleration $a_0$ is greater than $\Delta T$, it can be believed that this is a process before collision caused by fall. Wherein, $\Delta T$, $\Delta S$ and $a_0$ can be dynamically adjusted according to the user's weight, height and movement state (quantity).

The above is about human fall detection based on acceleration calculation. This embodiment can also perform detection based on acceleration and speed. When the detected acceleration is lower than the low acceleration threshold value, first of all, there will be a series of acceleration and speed within a fixed time interval, wherein, the length of time of the series can be enough to contain a complete fall process and the normal movement process before fall. The user's initial speed is defaulted to zero, and the human body's approximate speed at certain time can be calculated according to the three-axis acceleration and time.

Meanwhile, the user's current movement intensity and state can be obtained through the acceleration and speed series within the fixed length of time, so that some parameters related to fall verification can be adjusted, and the model can more accurately detect the state before fall.

The human fall detection method can be based on smart phones and other devices with acceleration detection and communication functions, and is based on the kinematic and dynamic differences between the safe movement state and the fall of human body. As long as a user carries a smart phone installed with the human fall detection application with him, the application will automatically collect and analyze dynamic information of the human body, judge whether the human fall or not, and can send SMS and make a call to give alarm or notification by virtue of the communication advantage of mobile phone. Compared to other fall detection devices that require additionally purchasing and outfitting, the present invention has advantages of wide application range, low price, convenience to carry and thus relatively high practicability; the key lies in that the present invention gives full consideration to the human movement behavior characteristics, increases the detection rate and reduces the misjudgment rate.

Figure 7:
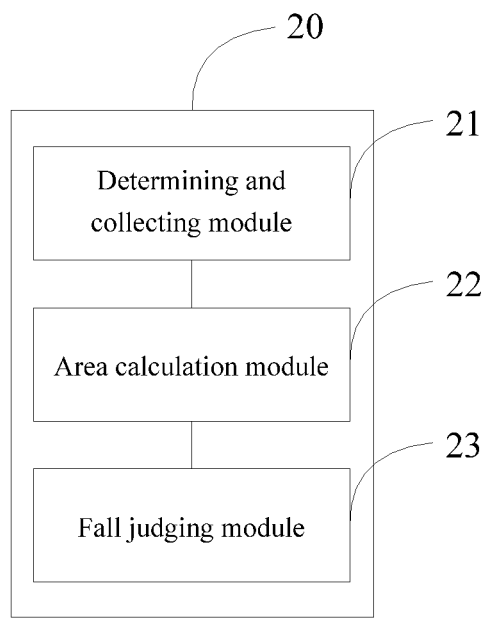
FIG. 7 is a structural schematic view of an embodiment of the human fall detection device under the present invention.

Referring to FIG. 7, an embodiment of a human fall detection device 20 under the present invention is provided. The device 20 can include: a determining and collecting module 21, an area calculation module 22 and a fall judging module 23; the determining and collecting module 21 is used to collect a resultant acceleration series within fixed time $I_0$ when the detected resultant acceleration is less than the low acceleration threshold value $a_0$; the area calculation module 22 is used to calculate the curve areas above and below the base line, which are surrounded by the curves in the $I_0$ coordinate and the base line, in the two-dimensional coordinate with resultant acceleration and time as the coordinate axes and $a_0$ as the base line; the fall judging module 23 is used to judge fall of human body when the difference between the curve area above the base line and the curve area below the base line is less than the curve area threshold value $\Delta S$ and the time of the resultant acceleration below the baseline is greater than the low acceleration time threshold value $\Delta T$.

In view of the problems existing in the existing fall detection techniques and detection devices, the human fall detection device 20 provided by the present invention can automatically detect the human body's acceleration information and speed information through a sensor, and correctly judge whether the human body has fallen or not by comprehensively analyzing human body's acceleration, speed, movement time and movement state, and remind if it's necessary to alarm for help, and the alarm can also be confirmed and canceled.

To achieve the human fall detection, the device 20 must at least be equipped with an acceleration sensor (such as three-axis acceleration sensor) as well as a communication module (such as the GSM module and CDMA module among the mobile communication modules) to achieve the function of calling for help. In order to be easy to carry and convenient to use, the device can be a mobile terminal, such as smart mobile phone, tablet computer and other common mobile terminal units. The human fall detection device 20 can be arranged in the mobile terminals, and because such common mobile terminal units usually provided with communication modules and acceleration sensors, they can be directly used without additional configuration.

Figure 8:
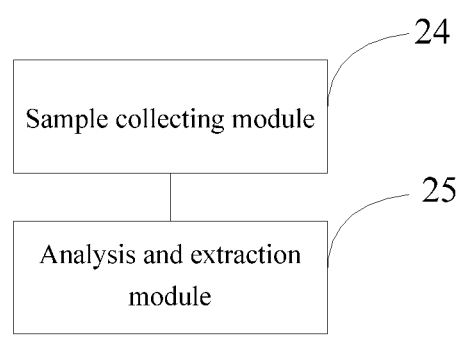
FIG. 8 is a schematic view of an embodiment of the human fall detection model system under the present invention.

Referring to FIG. 8, an embodiment of a human fall detection model system under the present invention is provided. The human fall detection model system can be arranged in the device 20. The human fall detection model system can include: a sample collection module 24 and an analysis and extraction module 25; the sample collection module 24 is used to collect the speed information of one and more human fall samples in the human fall process; the speed information includes resultant acceleration, speed and time; the analysis and extraction module 25 is used to analyze the characteristics of the speed information, calculate and extract low acceleration threshold value $a_0$, resultant acceleration series within fixed time $I_0$, high acceleration threshold value $a1$, curve area threshold value $\Delta S$ and low acceleration time threshold value $\Delta T$, and build the fall detection mechanism.

Before achieving fall detection, first collect the speed information in the human fall process through a plurality of fall experiments; the speed information includes resultant acceleration, speed and time; moreover, record the acceleration time series before the fall and collision, extract some acceleration characteristics, and build a fall detection model. The model can be constantly trained and optimized through the fall data.

The building of the fall detection model is a very important part to achieve accurate fall detection. First, analyze the related acceleration data acquired based on some experiments and related fall data; second, filter, fuse and extract kinematic and dynamic characteristics of human fall, such as: long-time low acceleration before fall, staggering before fall, etc., thereby establishing a fall detection model, and the model can be constantly training and self-adjusted. In the experiment, the movement state and fall of human body can be detected according to change of three-axis acceleration, wherein, the following characteristics can be extracted: low acceleration state of fall, speed, high speed state of staggering before collision, high speed state of collision and time of various state; third, build a dynamic human fall detection model according to the characteristics in order to match the three-axis acceleration value of human movement, and judge whether human falls or not according to the output probability. Some parameters in the model can be adjusted according to height, weight and movement quantity of human body and real-time movement state of human body.

The analysis and extraction module 25 can also be used to: associate the calculated and extracted low acceleration threshold value $a_0$, resultant acceleration series within fixed time $I_0$, high acceleration threshold value a1, curve area threshold value $\Delta S$ and low acceleration time threshold value $\Delta T$ with the corresponding human body state information to the sample; the human body state information includes height, weight and/or state of movement, etc. The height and weight can be an interval value.

Figure 9:
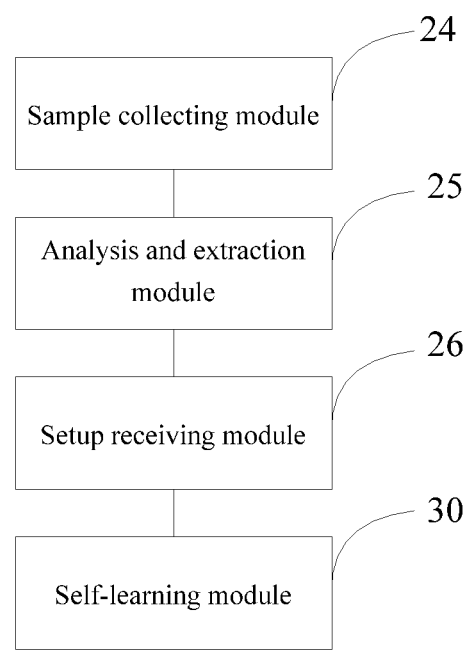
FIG. 9 is a schematic view of another embodiment of the human fall detection model system under the present invention.

Referring to FIG. 9, in another embodiment of the present invention, the human fall detection model system can also include:

A setup receiving module 26, which is used to receive the setup of human state information, and to adjust $a_0$, $\Delta S$ and/or $\Delta T$ according to the preset human body state information.

Because the model parameters can vary with human's height, weight, and real-time movement state, different users can set different parameters according to their different body state information, and the detection device will match corresponding $a_0$, $\Delta S$ and/or $\Delta T$ and other parameters according to the preset body state information.

The human fall detection model system can also include: a self-learning module 30, which is used to incorporate the self-detected human fall samples into the fall detection mechanism, and associate the speed information of the sample with the human body state information.

After the human fall detection model accurately judges a human fall event, such fall event can be incorporated in the human fall detection model after confirmed by the user. For example, collect and analyze the speed information in the human fall process, from which extract low acceleration threshold value $a_0$, resultant acceleration series within fixed time $I_0$, high acceleration threshold value a1, curve area threshold value $\Delta S$ and low acceleration time threshold value $\Delta T$, and associate the speed information with the human body state information, amend the established fall detection mechanism, in order to achieve the self-learning mechanism of the human fall detection model.

Figure 10:
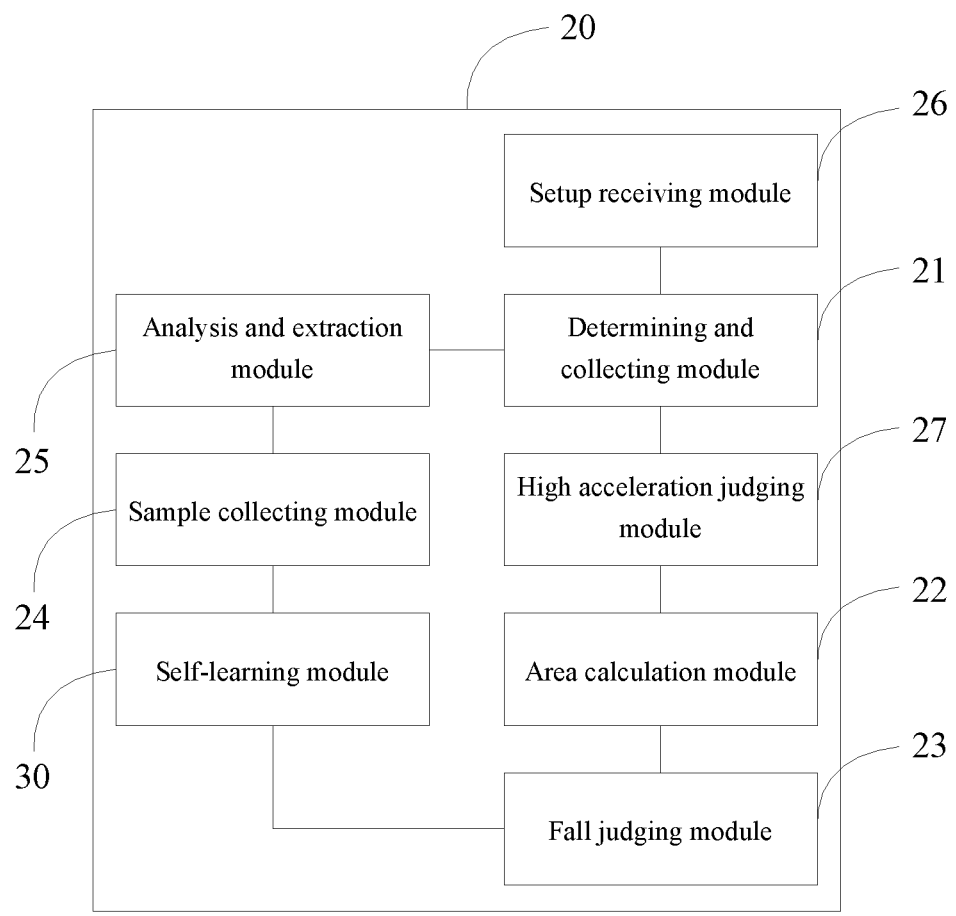
FIG. 10 is a structural schematic view of another embodiment of the human fall detection device under the present invention.

Referring to FIG. 10, in another embodiment of the present invention, the device 20 can also include: a high accelerate judging module 27, which is used to determine whether the series I0 has any resultant acceleration greater than the high acceleration threshold value a1 while collecting the resultant acceleration series I0; if yes, calculate the curve area through the area calculation module 22. There is always a process of maintaining low acceleration for a relatively long time before human fall, and higher acceleration also may occur before collision due to staggering and other external factors, therefore, detect the high acceleration again after the low acceleration process has been detected; if the high resultant acceleration is greater than the high acceleration threshold value $a_1$, go to the next step of fall judgment; otherwise, it can be judged no fall, and return to the initial resultant acceleration detection and judgment.

Figure 11:
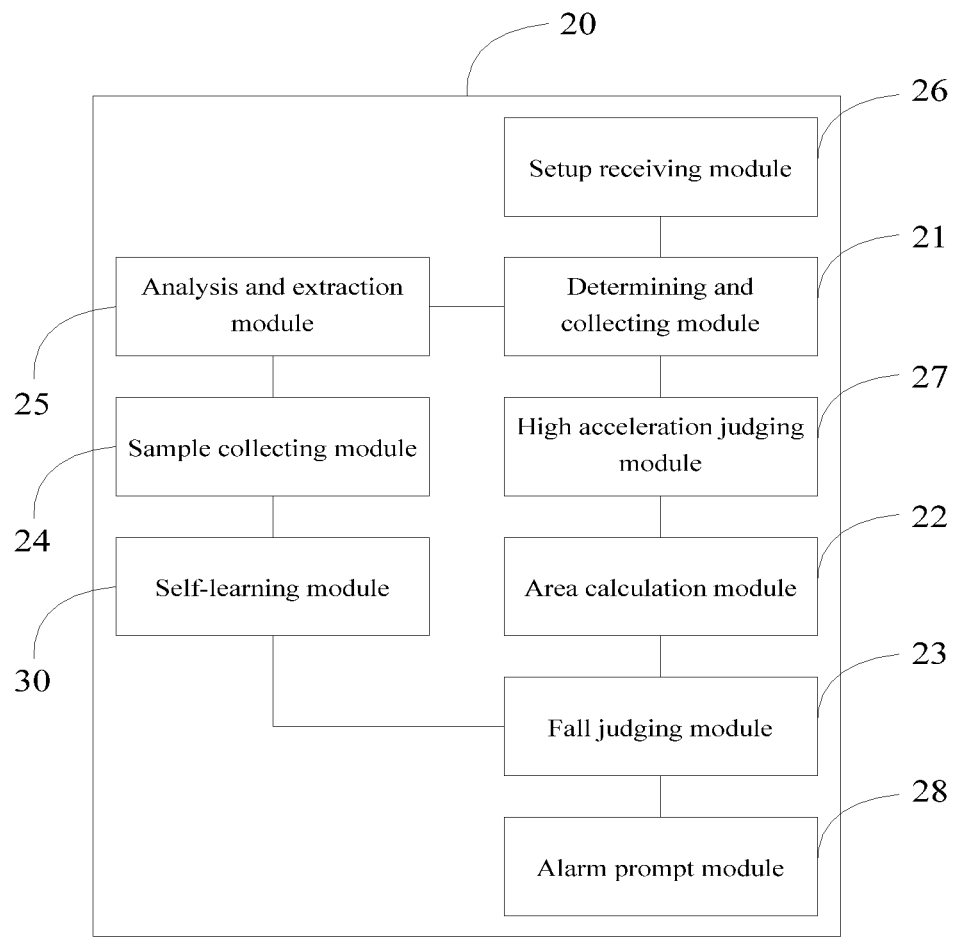
FIG. 11 is a structural schematic view of yet another embodiment of the human fall detection device under the present invention.

Referring to FIG. 11, in yet another embodiment of the present invention, the device 20 can also include: an alarm prompt module 28, which is used to collect the current speed series of the human body after judging the occurrence of fall; when the current speed maintains lower than the speed threshold value for a period of time longer than the set time, alarm prompt will be generated; when the alarm prompt is confirmed or unconfirmed for a certain period of time, the alarm will be given.

During the human fall detection in the embodiment, first of all, the initial speed of human body can be defaulted to zero, and the speed of the human body in every moment can be calculated according to the change of the three-axis acceleration (the gravitational acceleration has been taken into account). The three-axis acceleration will change along with the movement of the human body, so does the speed. According to the experimental data, an acceleration time series within a fixed length of time, and the time series can completely record the acceleration value of a fall process (including a period of time before and after the fall). Because the human body has a low acceleration state before fall, a low acceleration threshold value can also be drawn according to the experimental data. When the acceleration of the human body in the movement process is lower than the low acceleration threshold value, collecting acceleration data can begin in order to supply data for the fall detection model to detect, so as to further judge whether to collect data or empty data, and record the time (that is, go to the time series step). Because the human body may be in the high acceleration state before the collision due to staggering and other reasons, high acceleration can be further judged after judging the low acceleration; a high acceleration threshold value is drawn according to the experimental data, and when the acceleration of the human body in the movement process is higher than the high acceleration threshold value, the detection model can be used to match the collected acceleration data.

Then, calculate according to the set human body information such as height, weight and/or movement state, as well as the collected speed and acceleration information before and during the fall, and match with the model parameters; if the match is successful, occurrence of fall is indicated, and whether to give an alarm will be judged according to the speed information of the human body. If the human body maintains a sate lower than the speed threshold value for a period of time longer than the set time, alarm prompt will be generated, and the user can choose whether to alarm or not according to the actual situation. If there is not any operation for a certain period of time, the alarm will be given to the preset telephone number by means of SMS and/or phone call.

Meanwhile, a high acceleration threshold value can also be drawn according to the experimental data. When the resultant acceleration of the human body is greater than the threshold value, there is a possibility that the user comes under instantaneous intense collision, such as traffic accident. If the real-time monitored resultant acceleration is greater than the threshold value, alarm prompt will be directly generated, and the alarm will be given after confirmed by the user or timeout of the prompt.

Referring to FIG. 6, a two-dimensional coordinate schematic view with time (10 ms) as the horizontal coordinate and the resultant (force) acceleration (m/s2) as the vertical coordinate, and the resultant acceleration $a_0$ as the base line, displays that the detected resultant accelerations vary with time in the fall process: at the time from 100 to about 190, the resultant accelerations are about 10, indicating that the user may be standing; at the time from about 190 to about 430, the resultant accelerations vary up and down 10 uniformly and regularly, all of which are above $a_0$, indicating that the user may be walking normally; at the time from about 450 to about 490, the resultant accelerations first turn out lower than $a_0$ and lasts from 450 to 480, and then transitory high accelerations times higher than the normal state (10) occur and last between 480 and 490, wherein, the low accelerations indicate that the user may be in the state before fall, and the high accelerations indicate that the user may be in the state of collision after fall; it is obviously shown that, during the fall process, the curve area (surrounded by the curves formed by the accelerations in the coordinate and the base line) below the base line is greater than the curve area above the base line.

The calculation and matching method in the fall detection model is as follows: firstly, determine the low acceleration threshold value $a_0$ based on experiment and research, and when the resultant acceleration value generated in the process of human movement is lower than $a_0$, start collecting three-axis acceleration sensor data until a fixed acceleration time series $I_0$; and at the same time calculate as follows: calculate the acceleration curve area based on the base line $a_0$ from the moment of data collection, if the area surrounded by the acceleration and the base line $a_0$ is above the base line, the area value is taken as positive, otherwise negative, and the total curve area is the curve area above the base line plus the curve area below the baseline (i.e. equivalent to the difference of the curve area above the base line and the curve area below the base line when both of them are taken as positive); as long as the curve area is less than $\Delta S$, and the sum of the time in $I_0$ when the acceleration is lower than the acceleration $a_0$ is greater than $\Delta T$, it can be believed that this is a process before collision caused by fall. Wherein, $\Delta T$, $\Delta S$ and $a_0$ can be dynamically adjusted according to the user's weight, height and movement state (quantity).

The above is about human fall detection based on acceleration calculation. This embodiment can also perform detection based on acceleration and speed. When the detected acceleration is lower than the low acceleration threshold value, first of all, there will be a series of acceleration and speed within a fixed time interval, wherein, the length of time of the series can be enough to contain a complete fall process and the normal movement process before fall. The user's initial speed is defaulted to zero, and the human body's approximate speed at certain time can be calculated according to the three-axis acceleration and time. Meanwhile, the user's current movement intensity and state can be obtained through the acceleration and speed series within the fixed length of time, so that some parameters related to fall verification can be adjusted, and the model can more accurately detect the state before fall.

The human fall detection device 20 can be based on smart phones and other devices with acceleration detection and communication functions, and is based on the kinematic and dynamic differences between the safe movement state and the fall of human body. As long as a user carries a smart phone installed with the human fall detection application with him, the application will automatically collect and analyze dynamic information of the human body, judge whether the human fall or not, and can send SMS and make a call to give alarm or notification by virtue of the communication advantage of mobile phone. Compared to other fall detection devices that require additionally purchasing and outfitting, the present invention has advantages of wide application range, low price, convenience to carry and thus relatively high practicability; the key lies in that the present invention gives full consideration to the human movement behavior characteristics, increases the detection rate and reduces the misjudgment rate.

Figure 12:
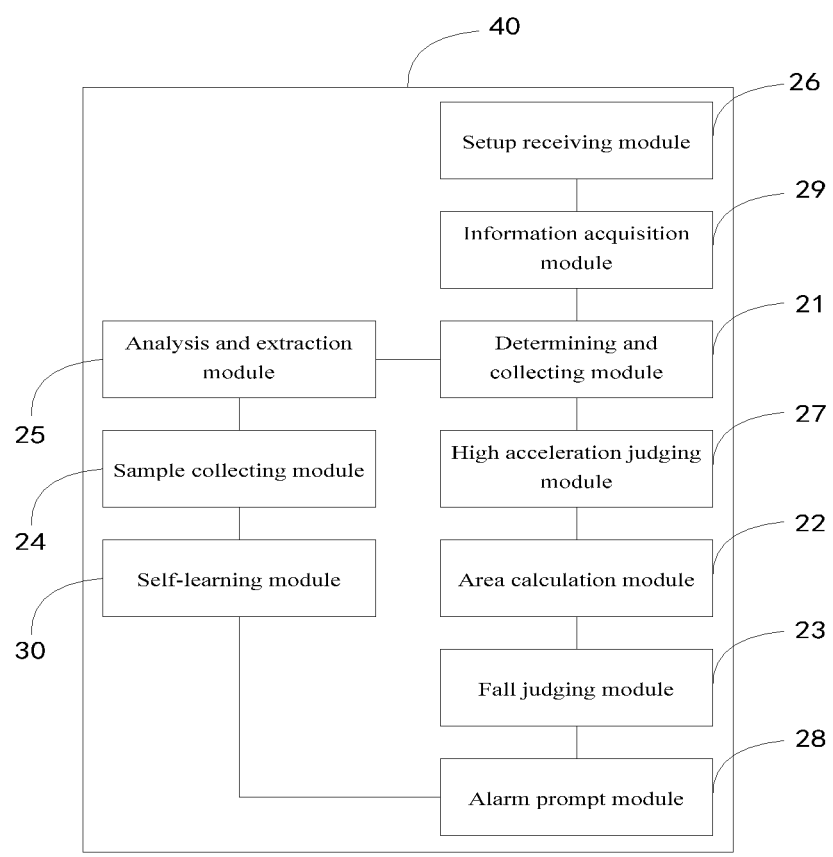
FIG. 12 is a structural schematic view of an embodiment of the mobile terminal system under the present invention.

Referring to FIG. 12, an embodiment of a mobile terminal system 40 under the present invention is provided. The mobile terminal system 40 can include: an information acquisition module 29, a determining and collecting module 21, an area calculation module 22, a fall judging module 23 and an alarm prompt module 28. The information acquisition module 29 is used to acquire speed information through the three-axis acceleration sensor; the determining and collecting module 21 is used to collect a resultant acceleration series within fixed time $I_0$ when the detected resultant acceleration is less than the low acceleration threshold value $a_0$; the area calculation module 22 is used to calculate the curve areas above and below the base line, which are surrounded by the curves in the $I_0$ coordinate and the base line, in the two-dimensional coordinate with resultant acceleration and time as the coordinate axes and $a_0$ as the base line; the fall judging module 23 is used to judge fall of human body when the difference between the curve area above the base line and the curve area below the base line is less than the curve area threshold value $\Delta S$ and the time of the resultant acceleration below the base line is greater than the low acceleration time threshold value $\Delta T$; collect the current speed series of the human body after judging the occurrence of fall; when the current speed maintains lower than the speed threshold value for a period of time longer than the set time, alarm prompt will be generated; when the alarm prompt is confirmed or unconfirmed for a certain period of time, the alarm will be given.

The mobile terminal system 40 can also include: a sample collection module 24, an analysis extraction module 25, a high acceleration judging module 27, a setup receiving module 26 and a self-learning module 30, etc. Details of the determining and collecting module 21, the area calculation module 22, the fall judging module 23, the sample collection module 24, the analysis and extraction module 25, the high acceleration judging module 27, the setup receiving module 26, the alarm prompt module 28 and the self-learning module 30 in the embodiment can be referred to the above embodiments.

The mobile terminal system 40 can be based on smart phones and other devices with acceleration detection and communication functions, and is based on the kinematic and dynamic differences between the safe movement state and the fall of human body. As long as a user carries a smart phone installed with the human fall detection application with him, the application will automatically collect and analyze dynamic information of the human body, judge whether the human fall or not, and can send SMS and make a call to give alarm or notification by virtue of the communication advantage of mobile phone. Compared to other fall detection devices that require additionally purchasing and outfitting, the present invention has advantages of wide application range, low price, convenience to carry and thus relatively high practicability; the key lies in that the present invention gives full consideration to the human movement behavior characteristics, increases the detection rate and reduces the misjudgment rate.

What is said above are only preferred embodiments of the present invention, and shall not restrict the patent scope of the present invention. Any equivalent transformation of structure or process by using the description of the present invention and the drawings or directly or indirectly using such in other related technical fields should be similarly included in the protection scope of the present invention.

What is claimed is:

1. A method for building a human fall detection model, comprising:

collecting the speed information of one and more human fall samples in the human fall process, wherein the speed information includes resultant acceleration, speed and time;

analyzing the characteristics of the speed information, calculating and extracting low acceleration threshold value $a_0$, resultant acceleration series $I_0$ within a fixed time, high acceleration threshold value $a_1$, curve area threshold value $\Delta S$ and low acceleration time threshold value $\Delta T$, and building the fall detection mechanism, wherein in a two-dimensional coordinate and a base line, with time as the horizontal coordinate and the resultant acceleration as the vertical coordinate and the resultant acceleration $a_0$ as the base line, a curve area calculated by the curves formed by the accelerations; and the human fall detection method comprising:

Step S11, judging if the detected human resultant acceleration is less than the low acceleration threshold value $a_0$, and if the detected human resultant acceleration is less than the low acceleration threshold value $a_0$, then go to Step S12; otherwise, continue to detect;

Step S12, collecting resultant acceleration series $I_0$ within a fixed time;

Step S13, in the two-dimensional coordinate with resultant acceleration and time as the axes and $a_0$ as the base line, calculate the curve area above the base line and the curve area below the base line that are surrounded by the curves in $I_0$ coordinates and the base line;

Step S14, judging if the difference between the curve area above the base line and the curve area below the base line is less than the curve area threshold valued $\Delta S$ and the time of resultant acceleration below the base line is greater than the low acceleration time threshold value $\Delta T$, and if the difference between the curve area above the base line and the curve area below the base line is less than the curve area threshold value $\Delta S$ and the time of resultant acceleration below the base line is greater than the low acceleration time threshold value $\Delta T$, then go to Step S15; otherwise, continue to detect;

Step S15, judging human fall.

2. The method for building a human fall detection model according to claim 1, wherein analyzing the characteristics of the speed information, and calculating and extracting low acceleration threshold value $a_0$, resultant acceleration series $I_0$ within a fixed time, high acceleration threshold value $a_1$, curve area threshold value $\Delta S$ and low acceleration time threshold value $\Delta T$ further comprises:

associating the calculated and extracted low acceleration threshold value $a_0$, resultant acceleration series $I_0$ within the fixed time, high acceleration threshold value a1, curve area threshold value $\Delta S$ and low acceleration time threshold value $\Delta T$ with the corresponding human body state information to the sample, wherein the human body state information includes height, weight and/or state of movement.

3. The method for building a human fall detection model according to claim 1, wherein the following is included after building the fall detection mechanism:

receiving the setup of human body state information, and adjusting $a_0$, $\Delta S$ and/or $\Delta T$ according to the human body state information.

4. The method for building a human fall detection model according to claim 1, wherein the method further comprises:

incorporating the self-detected human fall samples in the fall detection mechanism, and associating the speed information of the samples with the human body state information.

5. A human body fall detection model system, comprising:

a sample collection module, which is used to collect the speed information of one and more human fall samples in the human fall process, wherein the speed information includes resultant acceleration, speed and time;

an analysis and extraction module, which is used to analyze the characteristics of the speed information, calculate and extract low acceleration threshold value $a_0$, resultant acceleration series $I_0$ within a fixed time, high acceleration threshold value $a_1$, curve area threshold valued $\Delta S$ and low acceleration time threshold value $\Delta T$, and build the fall detection mechanism, wherein a curve area surrounded by the curves formed by the accelerations in a two-dimensional coordinate and a base line, with time as the horizontal coordinate and the resultant acceleration as the vertical coordinate and the resultant acceleration $a_0$ as the base line; and a human fall detection device comprising a determining and collecting module, an area calculation module and a fall judging module; and wherein the determining and collecting module is used to collect a resultant acceleration series $I_0$ within the fixed time when the detected resultant acceleration is less than the low acceleration threshold value $a_0$;

the area calculation module is used to calculate the curve area above base line and the curve area below the base line, which are surrounded by the curves in the two-dimensional coordinate and the base line; and the fall judging module is used to judge fall of human body when the difference between the curve area above the base line and the curve area below the base line is less than the curve area threshold value $\Delta S$ and the time of the resultant acceleration below the baseline is greater than the low acceleration time threshold value $\Delta T$.

6. The human body fall detection model system according to claim 5, wherein the analysis and extraction module is used to:

associate the calculated and extracted low acceleration threshold value $a_0$, resultant acceleration series $I_0$ within the fixed time, high acceleration threshold value $a_1$, curve area threshold value $\Delta S$ and low acceleration time threshold value $\Delta T$ with the corresponding human body state information to the sample, wherein the human body state information includes height, weight and or state of movement.

7. The human fall detection model system according to claim 5, wherein the system further comprises:

a setup receiving module, which is used to receive the setup of human state information, and to adjust $a_0$, $\Delta S$ and/or $\Delta T$ according to the preset human body state information.

8. The human fall detection model system according to claim 5, wherein the system further comprises:

a self-learning module, which is used to incorporate the self-detected human fall samples into the fall detection mechanism, and associate the speed information of the sample with the human body state information.

9. The method for building a human fall detection model according to claim 1, wherein the method further comprises:

Step S16, after judging the occurrence of fall, collecting the current speed series of the human body, generating alarm prompt when the current speed maintains lower than the speed threshold value for a period of time longer than the set time, and giving the alarm when the alarm prompt is confirmed or unconfirmed for a certain period of time.

10. The human fall detection model system according to claim 5, wherein the system further comprises a setup receiving module configured to receive the setup of human state information, and to adjust $a_0$, $\Delta S$ and/or $\Delta T$ according to the preset human body state information, and a high accelerate judging module used to determine whether the series $I_0$ has any resultant acceleration greater than the high acceleration threshold value $a_1$ while collecting the resultant acceleration series $I_0$; if yes, calculating the curve area through the area calculation module.

11. The human fall detection model system according to claim 10, wherein the system further comprises an alarm prompt module used to collect the current speed series of the human body after judging the occurrence of fall, generating an alarm prompt when the current speed maintains lower than the speed threshold value for a period of time longer than the set time, and giving the alarm when the alarm prompt is confirmed or unconfirmed for a certain period of time; and a self-learning module used to incorporate the self-detected human fall samples into the fall detection mechanism, and associating the speed information of the sample with the human body state information.

\* \* \* \* \*